July 6, 1965   T. BUDZICH ETAL   3,193,663
OVEN APPARATUS
Filed Oct. 24, 1960   3 Sheets-Sheet 2

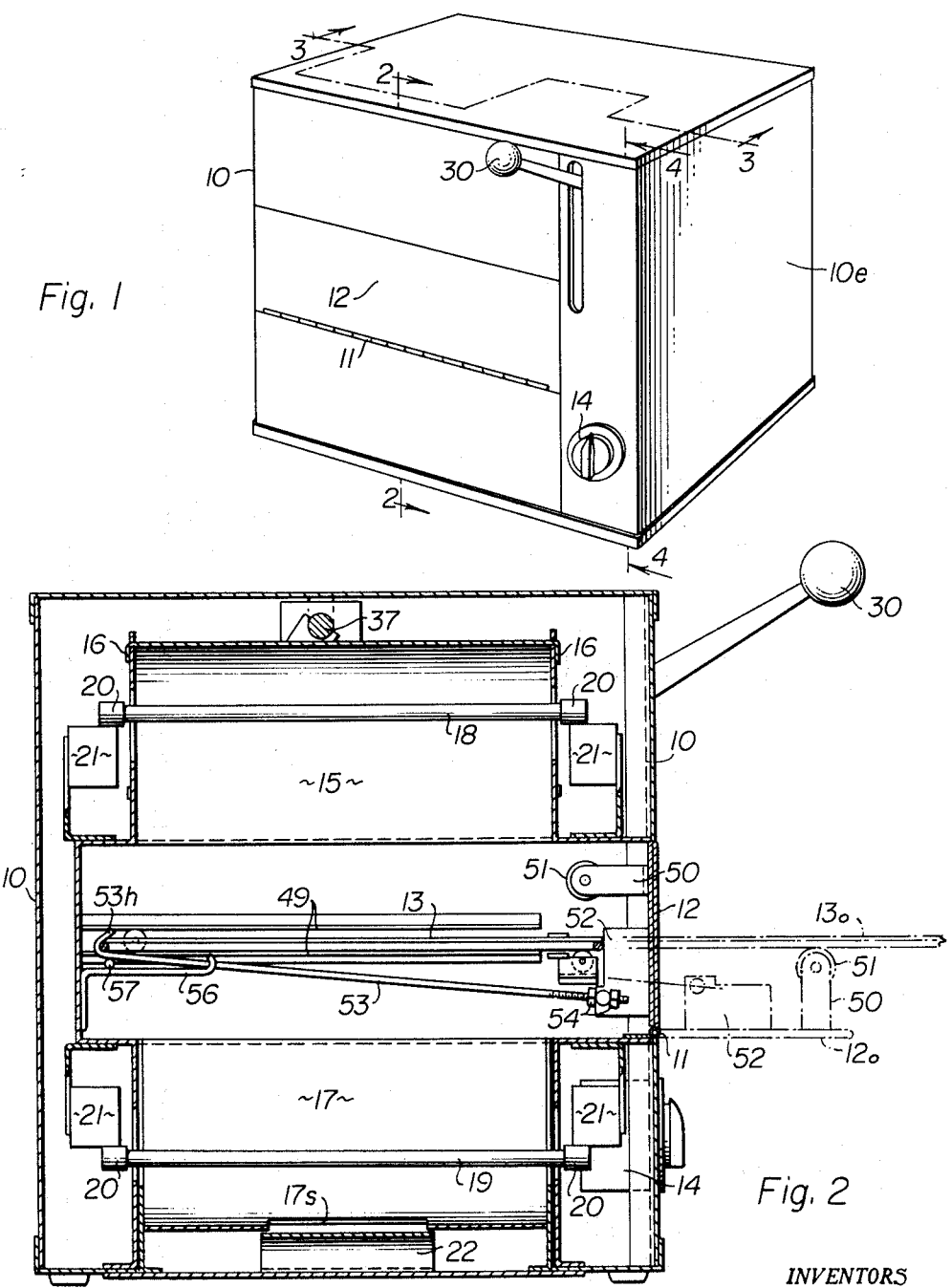

INVENTORS
TADEUSZ BUDZICH
ROBERT I. BRUDER
BY Richard H. MacCutcheon
Atty.

July 6, 1965     T. BUDZICH ETAL     3,193,663
OVEN APPARATUS

Filed Oct. 24, 1960     3 Sheets-Sheet 3

INVENTOR.
TADEUSZ BUDZICH
ROBERT I. BRUDER
BY Richard H. MacCutcheon
Atty.

United States Patent Office 3,193,663
Patented July 6, 1965

3,193,663
OVEN APPARATUS
Tadeusz Budzich and Robert I. Bruder, Shaker Heights, Ohio, assignors, by direct and mesne assignments, to Litton Industries, Inc., Beverly Hills, Calif.
Filed Oct. 24 1960, Ser. No. 64,435
2 Claims. (Cl. 219—405)

The present invention relates to food heating apparatus, and has particular significance in connection with apparatus for stimulating the sale of coin vended sandwiches and the like.

Heretofore, the vending machine industry has made ovens available to customers (without charge) for the heating of sandwiches and other edibles after they are received from coin vending machines, but the prior ovens have been very disadvantageous both from a safety and from a sales standpoint. For one thing it has been necessary for the customer to put his hands into the oven, which may be hot, when he loads the food, and again put his hands into the oven, which is surely hot, when he removes the food for consumption. Another disadvantage of ovens heretofore has been that any reflective surfaces have not been arranged to dispose heating rays uniformly across the surface of food to be heated. Another disadvantage of past ovens has been that wastes from food being heated, cheese drippings, crumbs, and the like, have tarnished and stained bottom reflecting surfaces and left a smelly and unattractive appearance as well as an unsanitary condition within the oven. At the same time such bottom surfaces in the past have been very difficult to clean and as a consequence the usefulness of the surfaces for reflecting heat has been impaired.

It is an object of the present invention to provide simple means for overcoming the above mentioned difficulties.

Another object of the invention is to provide hand operated heating oven apparatus the use of which does not require a human hand to either enter the oven or even contact a door of, or a handle attached to the door of, the oven.

Figure 3:
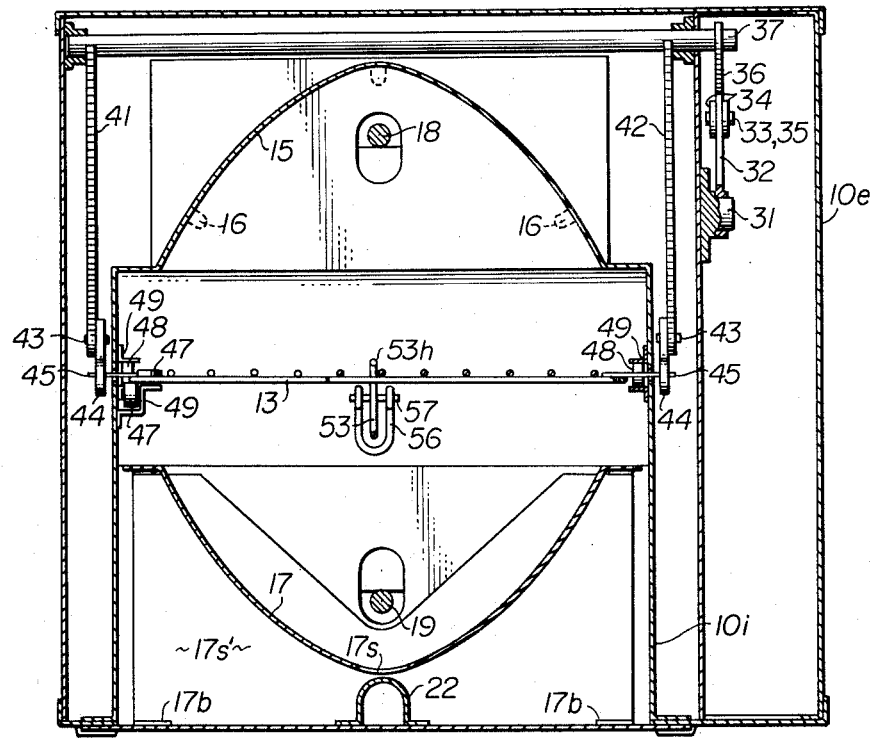
Figure 4:
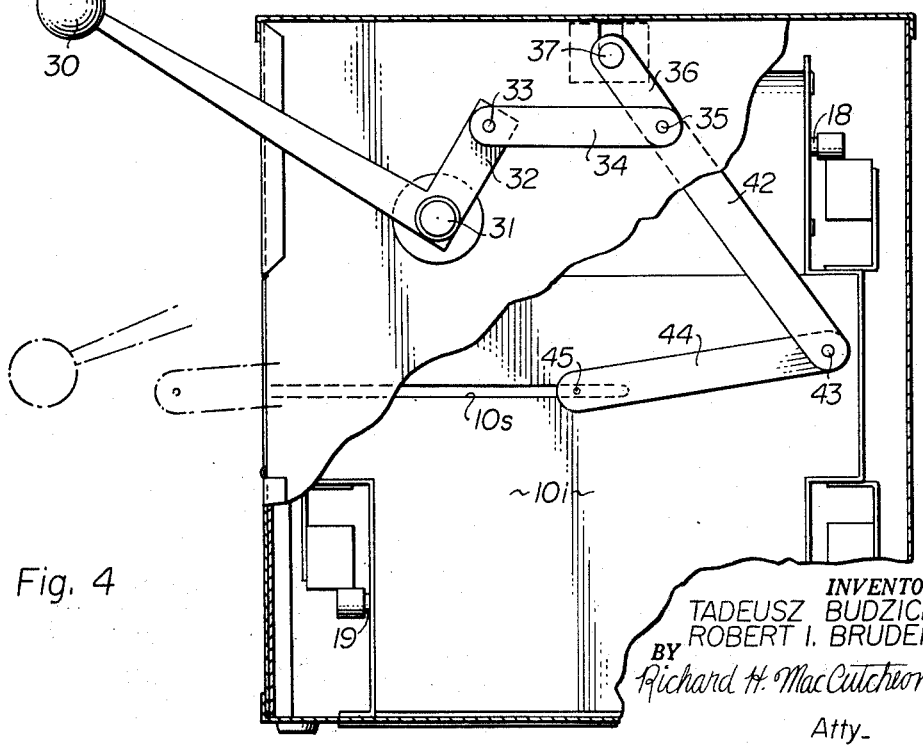
Figure 5:
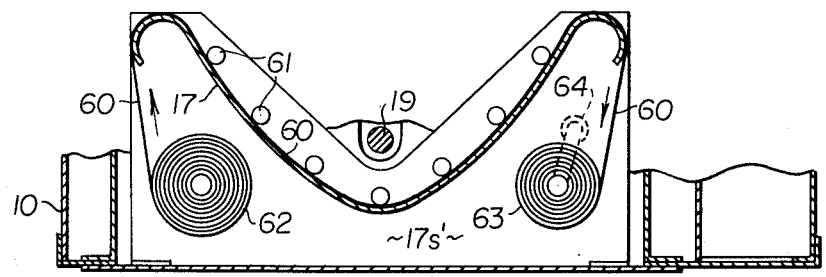
Figure 6:
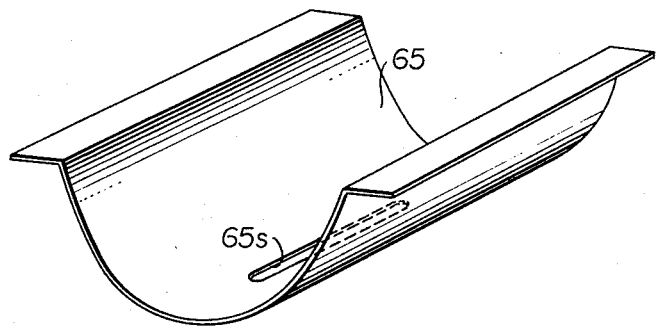

Other objects and advantages will become apparent and the invention may be better understood from consideration of the following description taken in connection with the accompanying drawing, in which:

FIG. 1 is a perspective view of an oven;
FIG. 2 is a longitudinal sectional elevation in the plane 2—2 of FIG. 1 and thus through the approximate center of the oven and showing operating mechanism constructed according to the present invention;
FIG. 3 is a transverse sectional elevation showing the position of reflecting surfaces, food supporting rack and heating elements;
FIG. 4 is an end view with side panel removed so as to show operating linkages for the oven of FIGS. 1 and 2;
FIG. 5 illustrates a modification;
FIG. 6 shows a preformed disposable member useful as another modification.

Referring now to FIGS. 1–2 there is shown an oven having an outer framework 10 to which is secured as by bottom hinge 11 a loading and unloading door 12 which takes the dashed position 12o when the door is open and a rack 13 is fully extended to the position shown dashed at 13o in FIG. 2.

As seen in FIGS. 2–3 there is a curved top reflecting surface 15 secured by tabs 16 with respect to the outer frame 10. A similarly curved bottom reflector 17 is removable with respect to the housing, as hereafter described. Properly spaced with respect to rack and the predetermined curvature of each curved surface is a pair of linearly extending heat sources 18, 19, respectively, each of which may be, for example, an infra-red quartz tube of conventional design and powered as by a timer 14 and wiring not shown. The quartz tubes are supported by terminals 20 secured with respect to the frame by brackets 21.

As seen in FIG. 2, reflecting surface 17 has a bottom slot portion 17s, for receiving crumbs, boiled over foods, and the like, beneath which is located a reflecting surface 22 which has sides which are tapered (not shown) or curved, as shown, and serve to direct waste materials away from the heat rays by deflecting the waste materials outside of the area of the slot while at the same time providing continuous reflection from the region of the slot.

The door operating and rack sliding mechanism as shown in FIGS. 3 and 4 comprises a hand operating lever 30, which is pivoted about a pin 31 which is secured with respect to the housing. Hand lever 30 has an extension lever 32 which engages through a pin 33 a link 34. The link 34 in turn through a pin 35 engages a lever 36 which serves to rotate a shaft 37 which is journaled for rotation within the side walls of the housing.

As seen in FIG. 3, a pair of arms 41, 42 are fixed with respect to the shaft and with rotation arms 41 and 42 through pins 43 engage a pair of free links 44 which engage pins 45 which protrude from the rack 13. The rack is roller supported with respect to the housing and if desired two pairs of rollers 47 positioned on the housing near the door may support a front end of the rack and the rack itself at its back portion may have a pair of rollers 48 operable on tracks 49 associated with the housing.

As seen in FIG. 4 which shows an inner end wall 10i with the outer end wall 10e removed, there is a wall slot 10s permitting the associate pin 45 to slide backwards and forwards and cause rack actuation.

The hinged door 12 is equipped with a bracket 50 (see FIG. 2) holding roller means 51 for supporting the rack 13o in its extended position. A bracket 52 is also secured to the inside of the door 12. A pivoted link 53 connects with bracket 52 at its front end and at its far or rearmost end by a hook portion 53h engages the back of the rack 13 during the oven-door-closed position. The length of the linkage 53 is made adjustable by nuts 54 so as to maintain the door at a predetermined level when in the open position. A hook member 56 is secured to the inside of the back of the housing and is engaged by a cross member 57 which is welded or otherwise solidly secured to the linkage 53.

As already mentioned the bottom reflector surface 17 is removable. Thus the curved surface 17 may be a part of a structure having side walls 17s and bottom feet 17b all movable with respect to the outer frame 10 although bolts or other means may be used to temporarily secure one with respect to the other. If desired the top wall of this removable structure may be a non-reflective surface and there may be a movable reflective material film fed, for example from a supply reel, and the lower curved surface 17 may just provide a bottom guide for film 60 which is made to conform thereto as by rollers 61 (see FIG. 5), or a preformed thin disposable curved reflective shape 65 (see FIG. 6) might be used instead.

Operation of the oven

Thus the oven has outer framework 10 to which top and bottom reflecting surfaces are secured. The source of heating is shown as two longitudinal quartz tubes positioned between the reflector surfaces and the rack 13 which is placed in an intermediate position. The curvature of the reflecting surfaces is such as to provide uniform density of distribution of the infra-red heat rays across the area of the rack. These curved surfaces may be of a non-parabolic shape or they may be parabolic in which case each quartz tube is positioned in the focus of one parabolic shape. The bottom reflecting surface is preferably removable for cleaning. The movable rack 13 is guided by the rollers 47 and 48 engaging suitable rails such as 49 attached to the outer framework. There are eight rollers altogether, two pairs being attached to the outer framework 10 in a position near the door 12. The rollers with their axes of rotation positioned perpendicular to the rail surfaces engage extension of the rails and guide the rack in a horizontal plane preventing binding of the mechanism. The protruding pins 43 permanently attached to the rack interconnect with the linkage mechanism inducing motion. The linkage mechanism engaging the rack 13 on both sides consists of free links 44, arms 41, 42, shaft 37, lever 36, link 34, extension lever 32 and hand operated lever 30. The movement of the hand operating lever 30 will induce rotation around pin 31 and, through link 34, rotate shaft 37 as well as arms 41, 42 permanently fixed to shaft 37. This will move the rack 13 through free links 44. One protruding pin 45 operates in the slot provided in the inner shell 10i which constitutes a part of the outer framework 10.

The basic operation of the mechanism in sequence is as follows: The front door of the oven with the rack 13 in its back position is closed. The bracket 52 attached to door 12 through nuts 54 and linkage 53 equipped with hook portion 53h engages back of the rack 13 maintaining the door in a closed position. Outward motion of the rack 13 will engage the bracket 32 inducing rotation in the door 12 around bottom hinges 11. With the center of gravity of the door 12 displaced from the vertical plane passing through the center of rotation of hinge 11 the door, under the influence of gravity, will tend to fly open. However, the opening motion of the door is synchronized with the forward motion of the rack 13, the link 53 with top hook portion 53h preventing the door from opening. The forward motion of the rack 13 will gradually open the door 12 until cross member 57 permanently attached to link 53 will engage hook member 56 secured to the outer framework 10. In this position the door is fully open and prevented from further rotation by the link 53, although the horizontal position of the door can be adjusted by the nuts 54. From this position on, with the door being fully open, rack 13 is moved outwardly engaging the roller (or rollers) 51 attached to bracket 50. After the rack 13 is loaded with food the upward motion of the hand operating lever 30 will first retract the rack to the position where the back of the rack 13 will engage hook portion 53h of the link 53. Further inward motion of the rack 13 will gradually close the door 12. In its final retracted position the rack 13 is fully located between the heating elements and the curved reflecting surfaces. Although such a feature is not illustrated, it should be noted that to ease the effort of closing the door a spring may be provided which would reduce the force of gravity acing on the door in open position and therefore reduce the manual effort required to operate the linkage mechanism.

It is worth noting, too, that with the door fully open and the rack 13 fully extended the ends of free links 44 protrude through slots provided in the outer framework so the rack can be easily disengaged from the operating linkage for cleaning.

One important feature of the invention is that any bottom reflecting surface 17, 60 or 65 can be removed for cleaning. This bottom reflecting surface may be equipped with one or with a multiplicity of slots 17s which permit the food portions dropping to the region of the bottom reflecting surface a free passage from the high heat zone to the bottom of the oven. At the same time the small curved reflector 22 prevents direct impingement of the infra-red rays on either the waste or the bottom part of the oven by reflecting the rays back to the heating zone while permitting free passage of the food particles.

Another and important feature of the invention is the fact that a curved disposable insert (65) of the same curvature as the bottom surface may be used. This permits the reflecting surface to be changed at frequent intervals without the bother of cleaning tarnished reflecting surfaces. Such a disposable insert may be made of thin gauge aluminum foil.

The disposable insert may be preformed to shape or there may be a thin sheet of foil fed from a roll 62 pivoted for rotation below the curved surface. Such a sheet of foil then is passed under the series of rollers 61 spaced at minimum distance from the lower curved surface and fed onto a take-up roll 63 equipped with a hand operated crank 64. Rotation of the crank and take-up roll will induce motion in the sheet of thin foil covering the curved surface, the small rollers maintaining its shape and providing a reflecting surface very closely approximating the curvature of the bottom curved surface. In this way, at frequent intervals dirty and tarnished reflecting surfaces can be changed with minimal effort.

While we have illustrated and described a particular embodiment, various modifications may obviously be made without departing from the true spirit and scope of the invention which is intended to be defined only by the accompanying claims taken with all reasonable equivalents.

We claim:

1. In an infra-red oven for heating food items, the combination of an oven structure comprising an outer shell, a hinged door in said shell, a top longitudinally extending transversely curved reflecting surface secured within said shell, an infra-red heating element longitudially disposed with respect to said curved reflecting surface, a longitudinally extending transversely curved bottom reflecting surface, an infra-red heating element longitudinally disposed with respect to said curved bottom reflecting surface, a food material receiving rack intermediate the top and bottom curved reflecting surfaces and opposite the door, means associated with the rack for engaging the door at the beginning of rack ejection for initiation of door opening, means including a linkage associated with the shell and arranged to operatively connect said door and rack and for attaining and holding intermediate positions and full opening of said door as the rack slides out, and means including a linkage associated with said rack for closing the door during rack retraction.

2. The infra-red oven of claim 1 in which the bottom reflecting surface comprises a disposable insert of film material having reflective characteristics, said disposable insert being preformed before insertion into the oven to cause it to conform to the curvature of the bottom surface whereby to mate therewith.

References Cited by the Examiner

UNITED STATES PATENTS

| | | | |
|---|---|---|---|
| Re. 24,296 | 3/57 | Stewart | 219—410 |
| 681,309 | 8/01 | Gentle | 126—339 |
| 1,023,646 | 4/12 | Herndon | 312—319 |
| 1,587,023 | 6/26 | Mottlau. | |
| 1,862,733 | 6/32 | Wright. | |
| 1,958,348 | 5/34 | Raley | 126—340 |
| 2,125,989 | 8/38 | Burch | 126—340 |
| 2,296,956 | 9/42 | Sickinger | 312—319 |
| 2,455,034 | 11/48 | Zoegall | 219—530 |
| 2,746,448 | 5/56 | Holmsten. | |
| 2,800,127 | 7/57 | Flynn. | |
| 2,825,326 | 3/58 | Flynn. | |
| 2,880,716 | 4/59 | Brodbeck | 126—340 |
| 2,882,890 | 4/59 | Shaw. | |
| 2,957,973 | 10/60 | Torrez | 219—525 X |
| 2,993,431 | 7/61 | Weishaus. | |
| 3,059,086 | 10/62 | Pedersen | 219—343 |

FOREIGN PATENTS 1,199,565    6/59    France.

RICHARD M. WOOD, *Primary Examiner.*

MAX L. LEVY, JEROME SCHNALL, *Examiners.*